United States Patent
Good

(10) Patent No.: US 10,560,700 B1
(45) Date of Patent: *Feb. 11, 2020

(54) ADJUSTING ENCODING FRAME SIZE BASED ON AVAILABLE NETWORK BANDWIDTH

(71) Applicant: WOWZA MEDIA SYSTEMS, LLC, Golden, CO (US)

(72) Inventor: Charles F. Good, Cincinnati, OH (US)

(73) Assignee: Wowza Media Systems, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,227

(22) Filed: May 22, 2019

Related U.S. Application Data

(63) Continuation of application No. 16/037,786, filed on Jul. 17, 2018, now Pat. No. 10,349,059.

(51) Int. Cl.
    *H04N 19/52* (2014.01)
    *H04N 19/152* (2014.01)
    *H04N 19/196* (2014.01)
    *H04N 19/184* (2014.01)

(52) U.S. Cl.
    CPC ......... *H04N 19/152* (2014.11); *H04N 19/184* (2014.11); *H04N 19/196* (2014.11)

(58) Field of Classification Search
    None
    See application file for complete search history.

(56) References Cited

U.S. PATENT DOCUMENTS

| | | | |
|---|---|---|---|
| 5,832,125 | A | 11/1998 | Reese et al. |
| 6,349,094 | B1 | 2/2002 | Vastano et al. |
| 6,496,692 | B1 | 12/2002 | Shanahan |
| 6,567,117 | B1 | 5/2003 | Nago et al. |
| 6,882,624 | B1 | 4/2005 | Ma |
| 6,965,604 | B1 | 11/2005 | Sato et al. |
| 7,170,938 | B1 | 1/2007 | Cote et al. |
| 8,156,235 | B2 | 4/2012 | Barreto et al. |
| 8,503,539 | B2 | 8/2013 | Tran |
| 8,634,476 | B2 | 1/2014 | Tran |

(Continued)

FOREIGN PATENT DOCUMENTS

WO 2009149564 A1 12/2009

OTHER PUBLICATIONS

"FASTVDO: SmartCapture H.264/AVC/AAC Hardware Encoder USB Device"; retrieved on Mar. 7, 2014 from http://www.fastvdo.com/SmartCapture/; published Jan. 16, 2013, 1 page.

(Continued)

*Primary Examiner* — Peter D Le
(74) *Attorney, Agent, or Firm* — McDonnell Boehnen Hulbert & Berghoff LLP

(57) ABSTRACT

A method includes reducing, at an encoder, an encoding bit rate of video data in response to a first indication of available bandwidth for transmission of the encoded video data. The method includes reducing an encoding frame size of the video data in response to the encoding bit rate falling below a first threshold. The method also includes increasing the encoding bit rate in response to a second indication of the available bandwidth. The method further includes increasing the encoding frame size in response to the encoding bit rate rising above a second threshold. The second threshold is greater than the first threshold.

20 Claims, 4 Drawing Sheets

(56) References Cited

U.S. PATENT DOCUMENTS

| | | |
|---|---|---|
| 8,705,527 B1 | 4/2014 | Addepalli et al. |
| 9,106,887 B1 | 8/2015 | Owen |
| 9,332,167 B1 | 5/2016 | Pance |
| 9,609,332 B2 | 3/2017 | Owen |
| 2002/0131496 A1 | 9/2002 | Vasudevan et al. |
| 2003/0036365 A1 | 2/2003 | Kuroda |
| 2004/0117735 A1 | 6/2004 | Breen |
| 2005/0165696 A1 | 7/2005 | Jakobsson et al. |
| 2007/0121587 A1 | 5/2007 | Mundra et al. |
| 2007/0258702 A1 | 11/2007 | Sugio et al. |
| 2008/0043643 A1 | 2/2008 | Thielman et al. |
| 2008/0101466 A1 | 5/2008 | Swenson et al. |
| 2008/0120424 A1 | 5/2008 | Deshpande |
| 2008/0181221 A1 | 7/2008 | Kampmann et al. |
| 2010/0166062 A1 | 7/2010 | Perlman et al. |
| 2010/0250762 A1 | 9/2010 | Heath |
| 2010/0316119 A1 | 12/2010 | Mathew et al. |
| 2011/0216741 A1 | 9/2011 | Yang et al. |
| 2011/0310227 A1 | 12/2011 | Konertz et al. |
| 2011/0310957 A1 | 12/2011 | Le Floch et al. |
| 2012/0030723 A1 | 2/2012 | Baum et al. |
| 2012/0147946 A1 | 6/2012 | Gao et al. |
| 2012/0250762 A1 | 10/2012 | Kaye et al. |
| 2012/0254456 A1 | 10/2012 | Visharam et al. |
| 2012/0331106 A1 | 12/2012 | Ramamurthy et al. |
| 2013/0329777 A1 | 12/2013 | Konda et al. |
| 2014/0085501 A1 | 3/2014 | Tran |
| 2014/0226711 A1 | 8/2014 | Ramamoorthy et al. |
| 2015/0002682 A1 | 1/2015 | Tran |
| 2015/0312572 A1 | 10/2015 | Owen |
| 2018/0109823 A1 | 4/2018 | Yang et al. |

OTHER PUBLICATIONS

"How to use Wowza GoCoder video broadcasting iOS app with Wowza Media Server"; retrieved Jan. 6, 2014 from http://www.wowza.com/forums/content.php?500; published Apr. 30, 2013, 12 pages.

How to record live streams (HTTPLiveStreamRecord); retrieved on Jan. 6, 2014 from http://www.wowza.com/forums/content.php?123-How-to-record-live-streams-(HTTPLiveStreamRecord); published on Oct. 2, 2010, 14 pages.

Sorenson Media Forum—Adaptive Bitrate Encoding; retrieved on Mar. 7, 2014 from http://forum.sorensonmedia.com/forum/content.php?281-Adaptive-Bitrate-Encoding; published Jan. 9, 2012, 3 pages.

"Teradek Bond H.264 Bonded Cellular Broadcast Solution"; retrieved on Mar. 7, 2014 from http://www.teradek.com/pages/bond; published Feb. 8, 2014, 7 pages.

"How to set up live streaming using an RTMP-based encoder"; retrieved on Jan. 6, 2014 from http://www.wowza.com/forums/content.php?36; published Oct. 1, 2010, 8 pages.

"How can I record and save my live broadcast?"; retrieved Jan. 8, 2014 from https://ustream.zendesk.com/entries/21127033-How-can-I-record-and-save-my-live-broadcast-; 2012 Ustream, Inc., 2012, 3 pages.

ADJUSTING ENCODING FRAME SIZE BASED ON AVAILABLE NETWORK BANDWIDTH

CROSS-REFERENCE TO RELATED APPLICATIONS

The present application is a continuation of and claims priority to U.S. patent application Ser. No. 16/037,786, filed on Jul. 17, 2018, the content of which is incorporated by reference herein in its entirety.

BACKGROUND

The popularity of the Internet, coupled with the ever-increasing capabilities of personal/mobile electronic devices, has provided users with the ability to enjoy, as well as to generate for others to enjoy, multimedia content almost anytime and anywhere. For example, users may receive streams corresponding to live and video on demand (VOD) content (e.g., television shows and movies) at personal electronic devices, such as computers, mobile phones, and tablet computers. Further, users may use a personal electronic device to capture and stream live events (e.g., sports events) to other users. An amount of bandwidth available to stream a live event may vary from location to location. For example, a sudden decrease in available bandwidth at the personal electronic device may result in a viewer of the live event stream experiencing an unpleasant viewing condition (e.g., loss of color, loss of definition, stuttering, choppiness, pauses, distortions, etc.).

Although an encoding bit rate that is used by an electronic device to generate such a stream can be set based on an amount of bandwidth that is available for transmitting the stream, it may be difficult to calculate or even measure the available bandwidth over a given network connection. Also, network conditions that affect the overall available bandwidth often change during a streaming event. Under uncertain and variable network bandwidth conditions, a media system can attempt to provide a high-quality media stream by continually increasing the bit rate to fill the available network bandwidth and then lowering the bit rate when the bit rate has exceeded the available bandwidth. However, simply increasing the bit rate is often not the most effective method to use additional network bandwidth to improve the quality of the media stream. In addition, increasing and decreasing the bit rate as described above results in a system that tends to oscillate the bit rate up and down, which may produce undesired noticeable effects that undermine the perceived quality of the media stream.

SUMMARY

The present disclosure is directed to adjusting encoding parameters including frame size at a media stream device in response to a change in available network bandwidth at the media stream device. For example, a media stream device may detect an increase or decrease in available network bandwidth while capturing, encoding, and sending a video stream to another device (e.g., a media server). The change in bandwidth may be due to improving or deteriorating network conditions. To illustrate, if the media stream device is utilizing a cellular connection to send a video stream, available network bandwidth may decrease during handoff of the media stream device between base stations, when the media stream device leaves an outdoor area and enters an indoor area, etc. Conversely, the available network bandwidth may increase when the media stream device leaves an indoor area and enters an outdoor area. As another example, available network bandwidth may change when the media stream device transitions between a third generation (3G) connection, a fourth generation (4G) connection, and an Institute of Electrical and Electronics Engineers (IEEE) 802.11 connection.

In response to a change in available network bandwidth, the media stream device may automatically adjust a bit rate used to encode a video stream. Visual quality at a lower bit rate is often improved by encoding using a smaller frame size and scaling the video to fit a larger frame size as compared to encoding the video at the lower bit rate using the larger frame size. The media stream device utilizes this effect by transitioning from a larger frame size to a smaller frame size when the available encoding bit rate falls below a threshold bit rate. When network conditions improve and the available encoding bit rate increases above another threshold bit rate, the encoding frame size is increased. The threshold bit rates can be set so that the transition to the smaller frame size occurs at a lower bit rate than the transition to the larger frame size in order to reduce or eliminate frame size "jitter" if the available bandwidth varies around a threshold bit rate. The described techniques may thus provide an adaptive encoding system and method that maintains an output video stream that may include varying frame sizes in the presence of changing network conditions.

DETAILED DESCRIPTION

Figure 1:
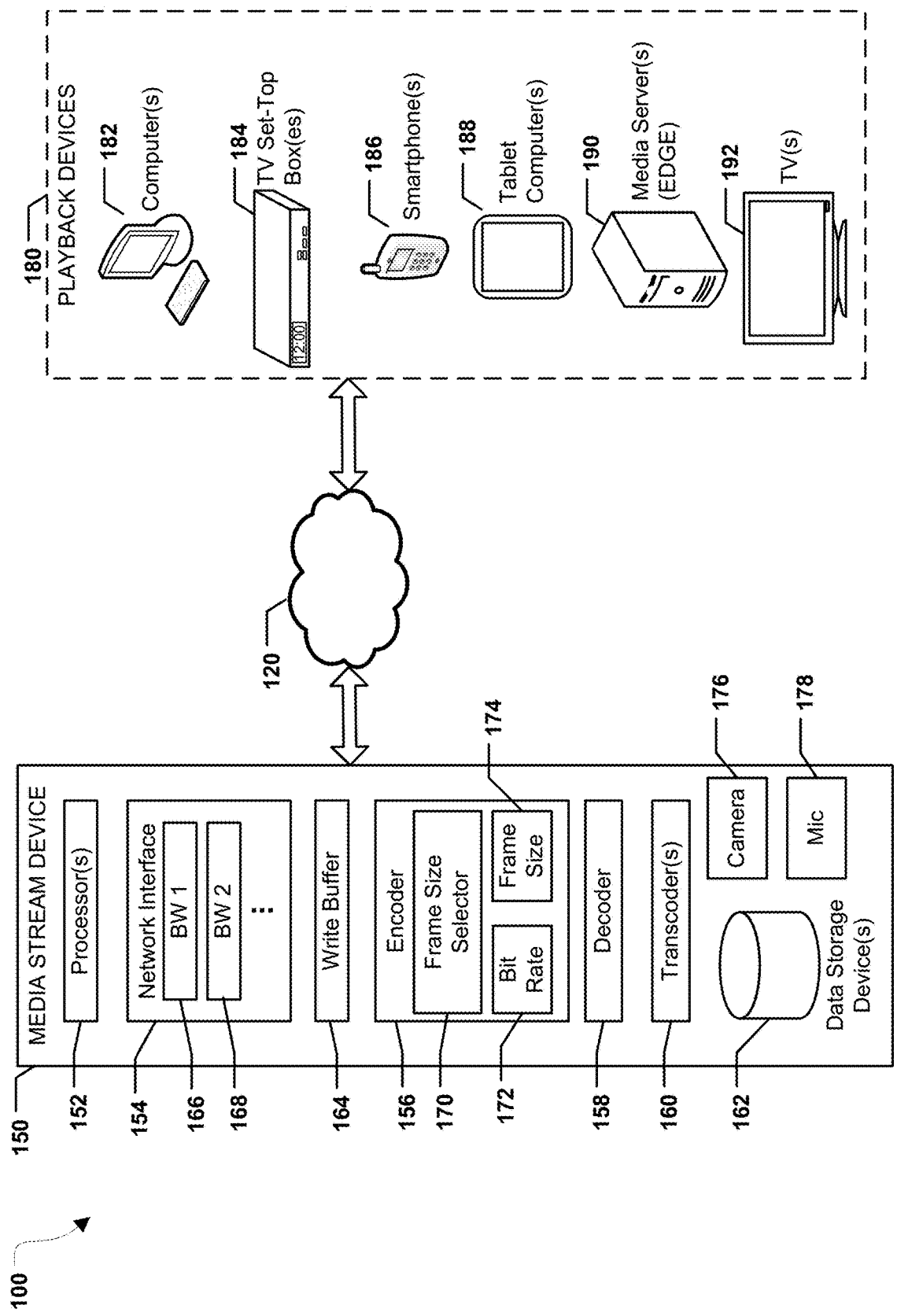
FIG. 1 illustrates a particular implementation of a system to support adaptive encoding of a stream at a media stream device.

FIG. 1 illustrates a particular implementation of a system 100 in which multimedia content may be streamed from a media stream device 150 to one or more computing devices 180. The media stream device 150 is configured to adjust an encoding frame size based on an available bandwidth to transmit the encoded multimedia content to the one or more computing devices 180.

The media stream device 150 is a computing device, such as a laptop computer, a mobile phone, a smartphone, a tablet computer, a media server, one or more other computing devices, or any combination thereof. In some examples, the media stream device 150 corresponds to a combination of at least a hardware encoder and video capture device (e.g., camera). In such examples, the hardware encoder receives a media signal from via input interface(s), such as via a high definition multimedia interface (HDMI) or a serial digital interface (SDI), where the media signal corresponds to live media or previously recorded media (e.g., video on demand (VOD) and/or digital video recorder (DVR)) content. In some examples, the media signal includes standard definition (SD), high definition (HD), ultra high definition (UHD), 4K, high dynamic range (HDR), 23.98/24/29.97/30/50/ 59.94/60 Hz frequency/frame rate, 8-bit color, and/or 10-bit color signals.

The media stream device 150 includes one or more processors 152 and various components that are executable by the one or more processors 152. The processor(s) 152 may include one or more a central processing unit (CPU), a graphical processing unit (GPU), a fixed function encoder, or a digital signal processor (DSP). The media stream device 150 may correspond to or include software application(s) that perform media serving or processing, hardware systems (e.g., servers) that support or perform media serving and processing, or any combination thereof. Thus, various operations described with reference to the media stream device 150, or components thereof, may be implemented using hardware, software (e.g., instructions executable by the one or more processors 152), or any combination thereof. In a particular implementation, one or more operations and/or components described with reference to the media stream device 150 may correspond to operations and/or components of a cloud-based media server (e.g., a media server available as software as a service (SaaS)).

The media stream device 150 may include one or more network interfaces, such as a representative network interface 154. For example, the one or more network interfaces may include input interface(s) and output interface(s) that are configured to receive data and to send data, respectively. In a particular implementation, the network interface 154 may include a wired interface, a wireless interface, or a combination thereof, that enables the media stream device 150 to transfer and receive data via a network 120, such as the Internet, a wireless network such as a 3G network, a 4G network, an IEEE 802.11-type network, one or more other networks, or any combination thereof. For example, the network interface 154 may include an Ethernet interface, a wireless interface compatible with an IEEE 802.11 protocol, or other wired or wireless interfaces.

The media stream device 150 may also include one or more encoders, such as a representative encoder 156, and one or more decoders, such as a representative decoder 158, each of which may be implemented using hardware, software (e.g., instructions executable by the one or more processors 152), or a combination thereof. The encoder 156 is configured to encode multimedia content, such as video data, to generate an encoded stream. In some implementations, the multimedia content is generated at the media stream device 150, such as by a camera 176, a microphone 178, one or more other media capture devices, or any combination thereof. In some implementations, the multimedia content is generated by decoding a received encoded stream at the decoder 158.

The encoder 156 includes a frame size selector 170 that is configured to adjust a bit rate 172 based on an available bandwidth for transmission of encoded data and to adjust a frame size 174 based on the bit rate 172. The encoder 156 utilizes the effect that overall quality can be enhanced by selectively decreasing the frame size 174 when reducing the bit rate 172 (in conjunction with scaling to the original frame size at a playback device) as compared to encoding using the original frame size at the lower bit rate. In some examples, when the frame size 174 is decreased, a command or other data is sent to a playback device to cause the playback device to scale up the received video to the previous frame size so a viewer does not see a surprising letterbox effect, regardless of whether the video is being viewed at the playback device within a graphical user interface (GUI) window or in full-screen mode. Such a command may be sent as part of the video stream being communicated to the playback device or may be sent out-of-band. Alternatively, the playback device may be configured, during windowed and/or full-screen playback, to automatically scale up video when frame size decreases.

The frame size selector 170 transitions the frame size 174 from a larger frame size to a smaller frame size when the encoding bit rate 172 available to the media stream device 150 falls below a threshold bit rate. When network conditions improve and the available encoding bit rate 172 increases above another threshold bit rate, the encoding frame size selector 170 increases the frame size 174. The threshold bit rates can be set so that the transition back to the smaller frame size occurs at a lower bit rate than the transition to the larger frame size in order to reduce or eliminate frame size "jitter" if the available bandwidth varies around a threshold bit rate, as described in further detail with reference to FIG. 2.

In a particular implementation, the encoder 156 generates an encoded stream that is an adaptive bit rate (ABR) rendition that may have larger or smaller bit rates, frame sizes, etc. as compared to an original stream. The media stream device 150 may stream the ABR renditions to destination devices, such as one or more of the computing devices 180, as further described herein. Although not shown in FIG. 1, output from the media stream device 150 may alternatively, or in addition, be provided to a publishing destination, such as a content delivery network (CDN) or a social network. In the case of publishing to a social network, output may be communicated via a social application programming interface (API). For example, use of the social API may enable output from the media stream device 150 to be inserted into a message, post, or newsfeed of a particular social networking account (which may correspond to a business entity or an individual). The media stream device 150 may also transmit output to a media server 142 that functions as a media ingestion point for a social network.

Transcoder(s) 160 may enable the media stream device 150 to provide adaptive bit rate streaming in real-time (e.g., on-the-fly) or near-real-time. Data storage device(s) 162 (e.g., solid-state drive (SSD) devices, magnetic storage, optical storage, etc.) may be used to store streamed events. The data storage device(s) 162 may also buffer chunks of an ABR rendition and store software programs and/or data used by the media stream device 150. The data storage device(s) 162 may include one or more computer-readable storage devices, such as random-access memory (RAM) devices, read-only memory (ROM) devices, hard-drive(s), solid state drive(s), one or more other types of storage devices, or any combination thereof.

The computing devices 180 may include devices that are configured to receive media stream(s) from the media stream device 150. For example, the computing devices 180 may include one or more computer systems 182, such as desktops, laptops, etc. The computing devices 180 may also include one or more televisions (TVs) 192, TV set-top-boxes 184, smartphones 186, and tablet computers 188. In a particular implementation, the media stream device 150 is configured to send media streams to one or more media server(s) 190, such as edge servers of a content delivery network (CDN).

During operation at the system 100, a media stream may be captured by the camera 176, the microphone 178, or both. The media stream device 150 may encode the media stream (e.g., a first portion of the media stream) in accordance with a first set of encoding parameters. For example, the first set of encoding parameters may include a first encoding bit rate, a first frame rate, a first frame size, a first key frame interval, a first set of audio/video coder/decoders (CODECs), one or more other encoding parameters, or any combination thereof. The media stream device 150 may send the encoded media stream to one or more of the computing devices 180 via the network 120. The media stream device 150 may use one of a plurality of streaming protocols to provide the stream to the one or more of the computing devices 180, including but not limited to real-time transport protocol (RTP), real-time transport protocol (RTP) control protocol (RTCP), real-time messaging protocol (RTMP) over transmission control protocol (TCP), or real-time streaming protocol (RTSP).

During transmission of the encoded media stream from the media stream device 150, the media stream device 150 may experience a change (e.g., increase or decrease) in available network bandwidth for transmission via the network interface 154. As illustrative, non-limiting examples, the available network bandwidth may change if the media stream device 150 changes physical locations or when a wireless or wireline medium becomes more or less congested as other devices join and exit the network 120.

The media stream device 150 may detect a change in available network bandwidth in various ways. For example, media stream device 150 buffers encoded media stream data generated by the encoder 156 in a write buffer 164 to keep the media stream intact and prevent data loss. The media stream device 150 may determine an indication of available network bandwidth by monitoring an amount of the write buffer 164 that is being used to buffer media stream data.

In an illustrative example, when streaming to a recipient device (e.g., one or more of the computing devices 180), the media stream device 150 encodes a video frame (or a portion thereof) and places the encoded frame (or portion thereof) in the write buffer 164. Encoded video data may arrive in the write buffer 164 at a speed equal to the encoding bit rate 172. The encoded video data in the write buffer 164 may be segmented into packets that are queued for transmission to the recipient device in accordance with the network bandwidth that is available to the media stream device 150. For example, when available network bandwidth decreases, the encoding bit rate 172 may exceed the available network bandwidth (or a threshold percentage thereof), resulting in accumulation of encoded media stream data in the write buffer 164 until buffer overflow occurs. The buffer overflow may cause dropped packets and video artifacts, such as loss of color, loss of definition, stuttering, choppiness, pauses, distortions, etc. Although buffer overflow can be prevented by dynamically increasing the size of the write buffer 164, as the write buffer 164 expands the video data that is received by the recipient device becomes more and more latent from the data arriving in the write buffer (e.g., the live feed). To prevent buffer overflow without expanding the write buffer 164, the media stream device 150 may decrease encoding quality, so that the media stream continues to be provided to the recipient device without (or with minimal) interruption. For example, the media stream device 150 may decrease the encoding bit rate 172, decrease the frame size 174, decrease the frame rate, increase the key frame interval, change the audio/video CODEC(s) in use, etc.

Conversely, when available network bandwidth increases, the media stream device 150 may increase encoding quality to take advantage of the additional available bandwidth. For example, the media stream device 150 may increase the encoding bit rate 172, increase the frame size 174, increase the frame rate, decrease the key frame interval, change the audio/video CODEC(s) in use, etc.

The media stream device 150 may use one or more other mechanisms to detect available network bandwidth, such as by detecting a change based on a type of the network connection. To illustrate, the media stream device 150 may receive or generate an indication that a network connection of a first type (e.g., 3G, 4G, IEEE 802.11, etc.) has been lost but a network connection of a second type is available, where the first and second types of network connections have different theoretical or measured available bandwidths. As another example, the media stream device 150 may receive or generate an indication of available network bandwidth based on a signal strength (e.g., a decibel (dB) measurement corresponding to a signal-to-noise ratio (SNR), a signal-to-interference-plus-noise ratio (SINR), etc.) of the network connection as measured by the media stream device 150 and provided to an encoding application via an application programming interface (API). As another example, the media stream device 150 may receive or generate an indication of a change in available network bandwidth based on quality of service (QoS) information that is generated by the networking interface 154, received from one or more of the computing devices 180, or a combination thereof.

When TCP is used to transmit the media stream, the media stream device 150 may detect a change in available network bandwidth based on TCP packet loss. For example, in the event of a loss of a TCP packet, one or more of the computing devices 180 may request that the media stream device 150 retransmit the packet. Alternatively, the media stream device 150 may automatically resend any packets for which the media stream device 150 has not received an acknowledgement from a recipient device of the one or more of the computing devices 180. The media stream device 150 may track the number of packets that have been retransmitted to estimate available network bandwidth. When RTP is used to transmit the media stream and RTCP is used in conjunction to monitor quality of service (QoS), the media stream device 150 may detect a change in available network bandwidth based on a receiver report associated with a recipient device of the one or more of the computing devices 180. It should be noted that the mechanisms described herein to estimate or measure available network bandwidth are for illustration, and not to be considered limiting. In alternate implementations, different mechanisms may be used to measure or determine available network bandwidth.

In response to a change in available network bandwidth, the media stream device 150 may automatically adjust one or more encoding parameters to generate a second set of encoding parameters. The media stream device 150 may begin encoding the media stream (e.g., a second portion of the media stream) based on the second set of encoding parameters instead of the first set of encoding parameters and may send the encoded media stream to a recipient device via the network 120. It should be noted that because slight variations in available network bandwidth may occur fairly frequently, not all changes in available network bandwidth result in an adjustment of encoding parameter(s). In a particular implementation, the media stream device 150 dynamically adjusts encoding parameter(s) if a detected change in available network bandwidth exceeds a threshold, which may be expressed as a percentage or as a value in bits/kilobits/megabits or bytes/kilobytes/megabytes per second. When a change in available network bandwidth exceeding the threshold is detected, the media stream device 150 adjusts a single parameter or multiple encoding parameters.

As an example, the media stream device 150 sets, for a given target frame size (e.g., 1080p), a first bit rate threshold. The first bit rate threshold indicates the bit rate at or below which the encoder 156 switches to a smaller frame size (e.g., 720p). The media stream device 150 also sets, for the smaller frame size (e.g., 720p), a second bit rate threshold. The second bit rate threshold indicates the bit rate at or above which the encoder 156 switches back to the target frame size (e.g., 1080p). For example, the first threshold and second threshold may be determined offline via visual experimentation and stored at the media stream device 150. The second threshold may correspond to a higher bit rate than the first threshold to reduce or eliminate jitter due to repeated frame size transitions under varying network bandwidth conditions. Additional thresholds may be set for additional transitions to and from other frame sizes, such as a third threshold to transition from the smaller frame size (e.g., 720p) to a next smaller frame size (e.g., 480p) and a fourth threshold to transition from the next smaller frame size (e.g., 480p) back to the smaller frame size (e.g., 720p). Additional details regarding setting bit rate thresholds for frame size transitions are provided with reference to the implementation of FIG. 2.

When a first available bandwidth 166 for transmitting an encoded media stream via the network interface 154 is detected to be smaller than a target bandwidth, the encoder 156 reduces the bit rate 172. For example, the first available bandwidth 166 may be detected based on an accumulation of encoded media stream data in the write buffer 164. After reducing the bit rate 172, the encoder 156 compares the bit rate 172 to the first threshold. In response to determining that the bit rate 172 is less than or equal to the first threshold, the frame size selector 170 reduces the frame size 174 to the smaller frame size.

When a second available bandwidth 168 is detected that is larger than the first available bandwidth 166, the encoder 156 increases the bit rate 172. For example, the second available bandwidth 168 may be detected based on a reduction of encoded media stream data in the write buffer 164. After increasing the bit rate 172, the encoder 156 compares the bit rate 172 to the second threshold. If the bit rate 172 is greater than or equal to the second threshold, the frame size selector 170 increases the frame size 174 to the target frame size.

By selectively adjusting frame size in addition to adjusting encoding bit rate, the media stream device 150 can provide higher overall quality streaming media content as compared to a system that adjusts bit rate using an unchanging frame size. In addition, by setting different bit rate thresholds for transitioning to a smaller frame size as compared to transitioning to a larger frame size, frame size jitter may be reduced or eliminated.

Figure 2:
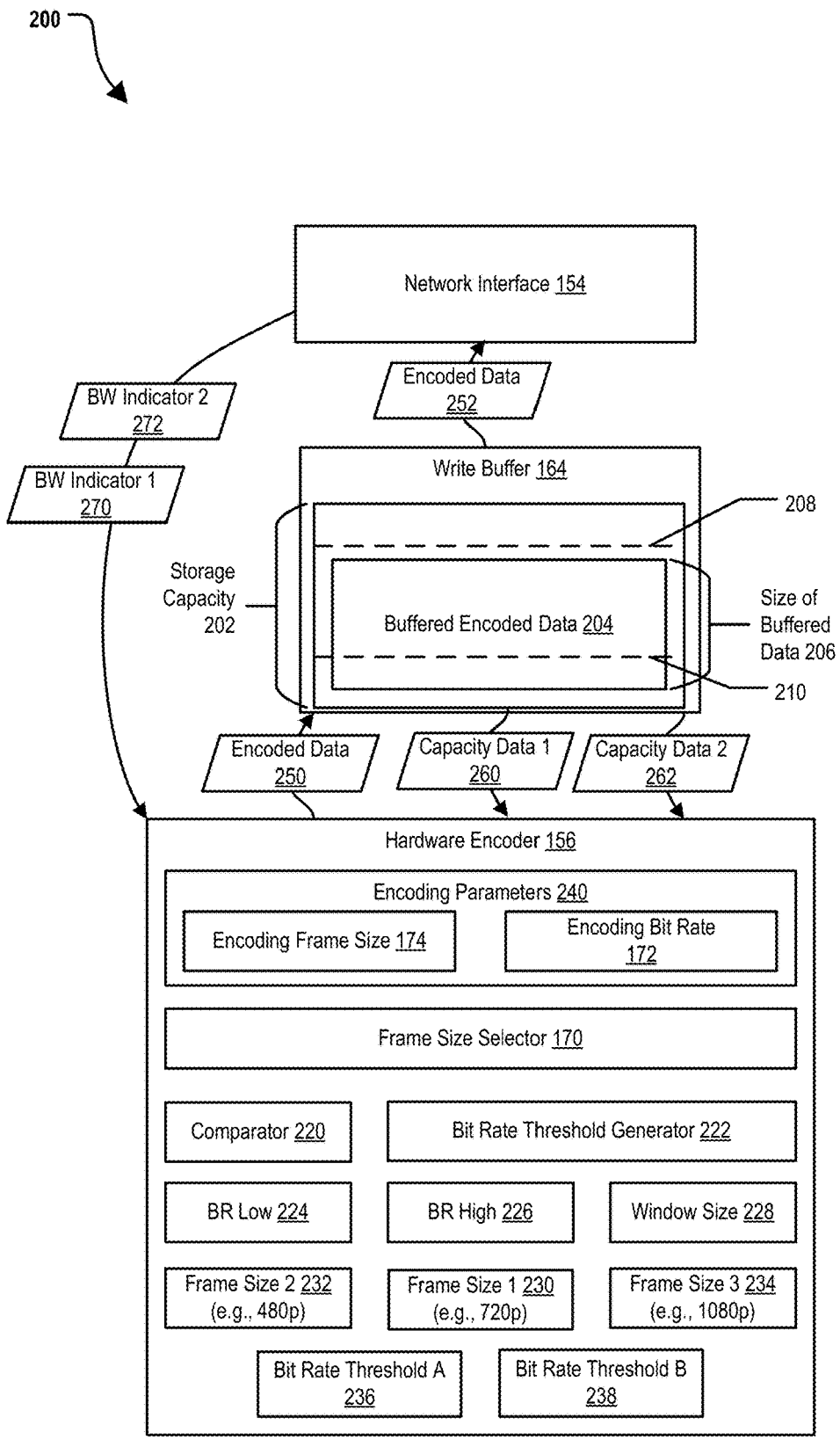
FIG. 2 depicts an exemplary block diagram of the media stream device of FIG. 1.

Referring to FIG. 2, a block diagram 200 depicts an illustrative example of components in accordance with a particular implementation of the media stream device 150, including the network interface 154, the write buffer 164, and the encoder 156.

The encoder 156 (e.g., a hardware encoder) includes the frame size selector 170, a comparator 220, and a bit rate threshold generator 222. The encoder 156 is configured to encode multimedia data based on a set of encoding parameters 240 that includes the encoding bit rate 172 and the encoding frame size 174. The encoding parameters 240 are dynamically adjustable based on an available bandwidth, as explained in further detail below. In an illustrative example, the encoder 156 supports encoding using a first frame size 230 (e.g., 720p), a second frame size 232 (e.g., 480p), and a third frame size 234 (e.g., 1080p).

The frame size selector 170 is configured to select a frame size based on a comparison of the encoding bit rate 174 to one or more bit rate thresholds. For example, the frame size selector 170 is configured to determine, based on a result of comparing the encoding bit rate 172 to a lower bit rate threshold (BR Low) 224 at the comparator 220, to reduce the encoding frame size 174. To illustrate, when the encoding frame size 174 is the first frame size 230, the frame size selector 170 reduces the encoding frame size 174 to the second frame size 232 in response to the encoding bit rate 172 falling below the lower bit rate threshold 224. As another example, the frame size selector 170 is configured to determine, based on a result of comparing the encoding bit rate 172 to a higher bit rate threshold (BR High) 226 at the comparator 220, to increase the encoding frame size 174. To illustrate, when the encoding frame size 174 is the first frame size 230, the frame size selector 170 increases the encoding frame size 174 to the third frame size 234 in response to the encoding bit rate 172 increasing above the higher bit rate threshold 226.

The bit rate threshold generator 222 is configured to determine the lower bit rate threshold 224 and the higher bit rate threshold 226. A bit rate threshold "A" 236 indicates a transition point for transitioning between the first frame size 230 and the second frame size 232. A bit rate threshold "B" 238 indicates a transition point for transitioning between the first frame size 230 and the third frame size 234. To reduce frame size jitter, the bit rate threshold generator 222 is configured to calculate the lower bit rate threshold 224 and the higher bit rate threshold 226 based on the bit rate thresholds 236, 238 and a window size 228.

To illustrate, in some implementations, the bit rate threshold generator 222 is configured to set the lower bit rate threshold 224 and the higher bit rate threshold 226 according to:

$B\text{-low}=B\text{-mid}-B\text{-window}/2$, and $B\text{-high}=B\text{-mid}+B\text{-window}/2$, where B-low corresponds to the lower bit rate threshold 224 to transition from the first frame size 230 to the second frame size 232, B-mid corresponds to the bit rate threshold A 236, B-window is used to smooth frame size switches and corresponds to the window size 228, and B-high corresponds to the higher bit rate threshold 226 to transition from the second frame size 232 to the first frame size 230.

Although a single lower bit rate threshold 224 and higher bit rate threshold 226 are illustrated, in other implementations more than two bit rate thresholds may be determined. For example, the bit rate threshold generator 222 may determine the following bit rate thresholds:

$B\text{-high}\_21=B\text{-mid}\_A+B\text{-window}\_A/2$, $B\text{-low}\_12=B\text{-mid}\_A-B\text{-window}\_A/2$, $B\text{-high}\_13=B\text{-mid}\_B+B\text{-window}\_B/2$, $B\text{-low}\_31=B\text{-mid}\_B-B\text{-window}\_B/2$, where B-high_21 is a bit rate threshold to transition from the second frame size 232 to the first frame size 230, B-low_12 is a bit rate threshold to transition from the first frame size 230 to the second frame size 232, B-high_13 is a bit rate threshold to transition from the first frame size 230 to the third frame size 234, B-low_31 is a bit rate threshold to transition from the third frame size 234 to the first frame size 230, B-mid_A is the bit rate threshold A 236, B-mid_B is the bit rate threshold B 238, B-window_A is a first value of the window size 228 to smooth transitions between the first frame size 230 and the second frame size 232, and B-window_B is a second value of the window size 228 to smooth transitions between the first frame size 230 and the third frame size 234. B-window_A and B-window_B may equal or differ from each other and may have values that are determined via experimentation or based on a history of frame switches and network conditions at the media stream device 150, as non-limiting examples. In implementations in which the encoder 156 supports more than three frame sizes, the bit rate threshold generator 222 can be configured to determine six or more bit rate thresholds.

During operation, the encoder 156 generates encoded data 250 that is buffered into the write buffer 164 for transmission. When network resources are available for transmission, encoded data 252 (e.g., a transmission packet) is extracted from the write buffer 164 and transmitted via the network interface 154. For example, the encoder 156 may initially encode multimedia data using the first frame size 230 (e.g., 720p) as a target encoding frame size 174. The network interface 154 is configured to transmit a stream of the encoded multimedia data from the write buffer 164 to a remote device.

The bit rate threshold generator 222 determines the lower bit rate threshold 224 based on the bit rate threshold A 236 and the window size 228 as a threshold for transition to the second frame size 232 (e.g., 480p). The bit rate threshold generator 222 also determines the higher bit rate threshold 226 based on the bit rate threshold B 238 and the window size 228 as a threshold for transition to the third frame size 234 (e.g., 1080p).

The encoder 156 starts to send a stream to a remote device over a network connection (for example RTMP over TCP). The encoder 156 monitors the network connection to see if bytes are backing up in the write buffer 164 indicating that the encoding bit rate 172 is higher than the available bandwidth. The encoding bit rate 172 is adjusted on the fly to reduce or eliminate the bytes in the write buffer 162 that are waiting to be sent.

To illustrate, the encoder 156 is configured to reduce the encoding bit rate 172 of video data in response to a first indication of available bandwidth for the encoded video data. In some implementations, the encoder 156 receives bandwidth indications from the network interface 154, such as first bandwidth indicator 270 that indicates an available bandwidth for transmission (e.g., a received bit rate from a receiver of the encoded media stream, a packet loss rate, etc.). In other implementations, the encoder 156 receives bandwidth indications that correspond to an amount of encoded data in the write buffer 164, such as first capacity data 260. In an illustrative, non-limiting example, the first capacity data 260 indicates a ratio of a size 206 of buffered encoded data 204 in the write buffer 164 as compared to a total storage capacity 202 for encoded data in the write buffer 164. For example, if the size 206 has increased above a first backlog threshold 208 (graphically illustrated at approximately 80% of the storage capacity 202), the encoding bit rate 172 is too high and should be reduced. If the size 206 has fallen below a second backlog threshold 210 (graphically illustrated at approximately 20% of the storage capacity 202), the encoding bit rate 172 is too low and should be increased.

After reducing the encoding bit rate 172 based on the first indication of the available bandwidth, the encoder 156 is configured to reduce the encoding frame size 174 of the video data in response to the encoding bit rate 172 falling below a first threshold. To illustrate, the comparator 220 is configured to compare the encoding bit rate 172 to the lower bit rate threshold 224. In response to the encoding bit rate 172 being less than the lower bit rate threshold 224, the frame size selector 170 selects the second frame size 232 (e.g., 480p) as the encoding frame size 174. The bit rate threshold generator 222 determines the higher bit rate threshold 226 based on the bit rate threshold A 236 and the window size 228 as a threshold for transition back to the first frame size 230 (e.g., 720p).

The encoder 156 is also configured to increase the encoding bit rate 172 in response to a second indication of the available bandwidth. To illustrate, the encoder 156 receives a second indication of available bandwidth that indicates the available bandwidth has increased as compared to the first indication of available bandwidth. In some implementations, the second indication of available bandwidth is received from the network interface (e.g., a second bandwidth indication 272), from the write buffer 164 (e.g., second capacity data 262), or a combination thereof.

After increasing the encoding bit rate 172 in response to the second indication of encoding bandwidth, the encoder 156 is configured to increase the encoding frame size 174 to the first frame size 230 in response to the encoding bit rate 172 rising above the higher bit rate threshold 226. In conjunction with increasing the encoding frame size 174, the higher bit rate threshold 226 is updated based on the bit rate threshold B 238 and the window size 228. If the encoding bit rate 172 continues to rise above the updated higher bit rate threshold 226, the frame size selector 170 updates the encoding frame size 174 to be the third frame size 234 (e.g., 1080p).

Thus, dynamic bit rate adjustment, based on updated network bandwidth, continues throughout the transmission of the media stream. Frame size transitions are implemented to improve overall quality based on the encoding bit rate 172, and frame size jitter is reduced or eliminated via use of separate transition thresholds based on the window size 228.

It will thus be appreciated that, as described with reference to FIGS. 1-2, particular implementations of the present disclosure enable dynamic adjustment of encoding parameters including frame size at a media stream device in response to a change in available network bandwidth. As a result, the media stream device may enhance a quality of the media stream for playback at another device as compared to simply adjusting the encoding bit rate.

Figure 3:
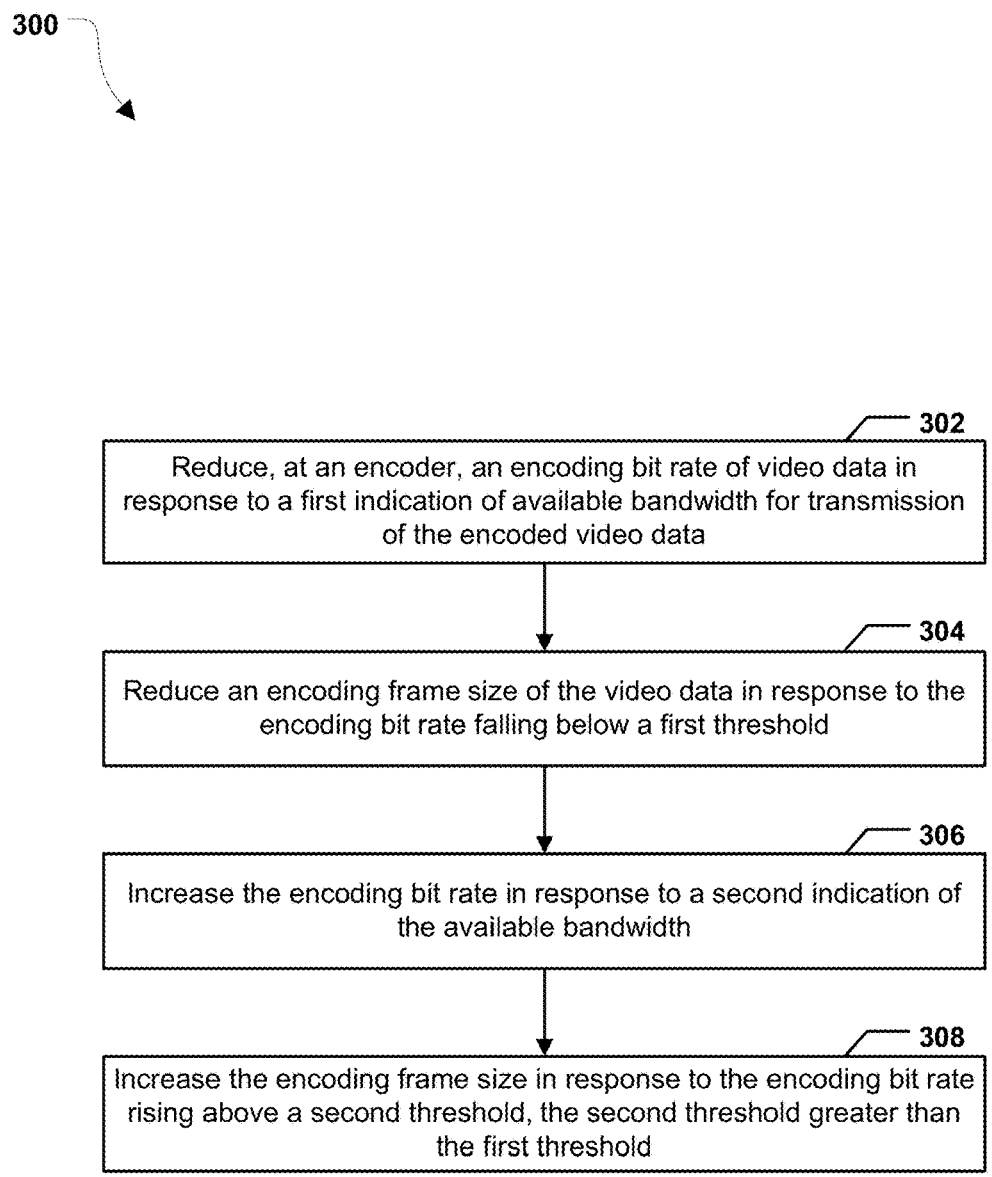
FIG. 3 is a flowchart that illustrates an implementation of a method of adjusting encoding parameters including frame size at a media stream device based on available network bandwidth.

FIG. 3 illustrates a particular implementation of a method 300 of adjusting encoding parameters including frame size at a media stream device based on available network bandwidth. In an illustrative implementation, the method 300 may be performed by the media stream device 150, such as in the encoder 156 of FIGS. 1-2, and may include transmitting a stream of encoded data to a remote device over a network connection.

The method 300 includes reducing, at an encoder, an encoding bit rate of video data in response to a first indication of available bandwidth for transmission of the encoded video data, at 302. In some implementations, the first indication of available bandwidth corresponds to an amount of encoded data in a write buffer exceeding a first backlog threshold, such as the first capacity data 260 indicating that the size 206 of the buffered encoded data 204 exceeds the first backlog threshold 208.

The method 300 includes reducing an encoding frame size of the video data in response to the encoding bit rate falling below a first threshold, at 304. In an illustrative example, the encoding frame size is reduced from a first frame size (e.g., the first frame size 230) to a second frame size (e.g., the second frame size 232) in response to the encoding bit rate falling below the first threshold (e.g., the lower bit rate threshold 224).

The method 300 includes increasing the encoding bit rate in response to a second indication of the available bandwidth, at 306. In some implementations, the second indication of available bandwidth corresponds to the amount of encoded data in the write buffer falling below a second backlog threshold, such as the second capacity data 262 indicating that the size 206 of the buffered encoded data 204 is less than (or has fallen below) the second backlog threshold 210.

The method 300 includes increasing the encoding frame size in response to the encoding bit rate rising above a second threshold, the second threshold greater than the first threshold, at 308. For example, the encoding frame size is increased from the second frame size 232 to the first frame size 230 in response to the encoding bit rate 172 rising above the second threshold (e.g., the higher bit rate threshold 226).

In some implementations, the first threshold and the second threshold are based on a first bit rate threshold, such as the bit rate threshold A 236, and the window size 228. In an illustrative example, the first bit rate threshold corresponds to a midpoint between the first threshold and the second threshold, and the window size 228 corresponds to a difference between the second threshold and the first threshold.

In some implementations, the method 300 includes increasing the encoding bit rate in response to a third indication of the available bandwidth and increasing the encoding frame size in response to the encoding bit rate rising above a third threshold. The third threshold is greater than the second threshold and, in some implementations, is based on a second bit rate threshold and the window size. For example, the frame size selector 170 increases the encoding frame size 174 from the first frame size 230 to the third frame size 234 in response to the encoding bit rate 172 increasing above the third threshold (e.g., the updated higher bit rate threshold 226).

The method 300 of FIG. 3 may thus enable an electronic device, such as the media stream device 150, to dynamically adjust encoding parameter(s) including frame size in response to changes in available network bandwidth of a network connection. Dynamic adjustment of encoding parameters including frame size enables the electronic device to enhance a quality of the media stream for playback at another device as compared to adjusting an encoding bit rate without adjusting encoding frame size.

Figure 4:
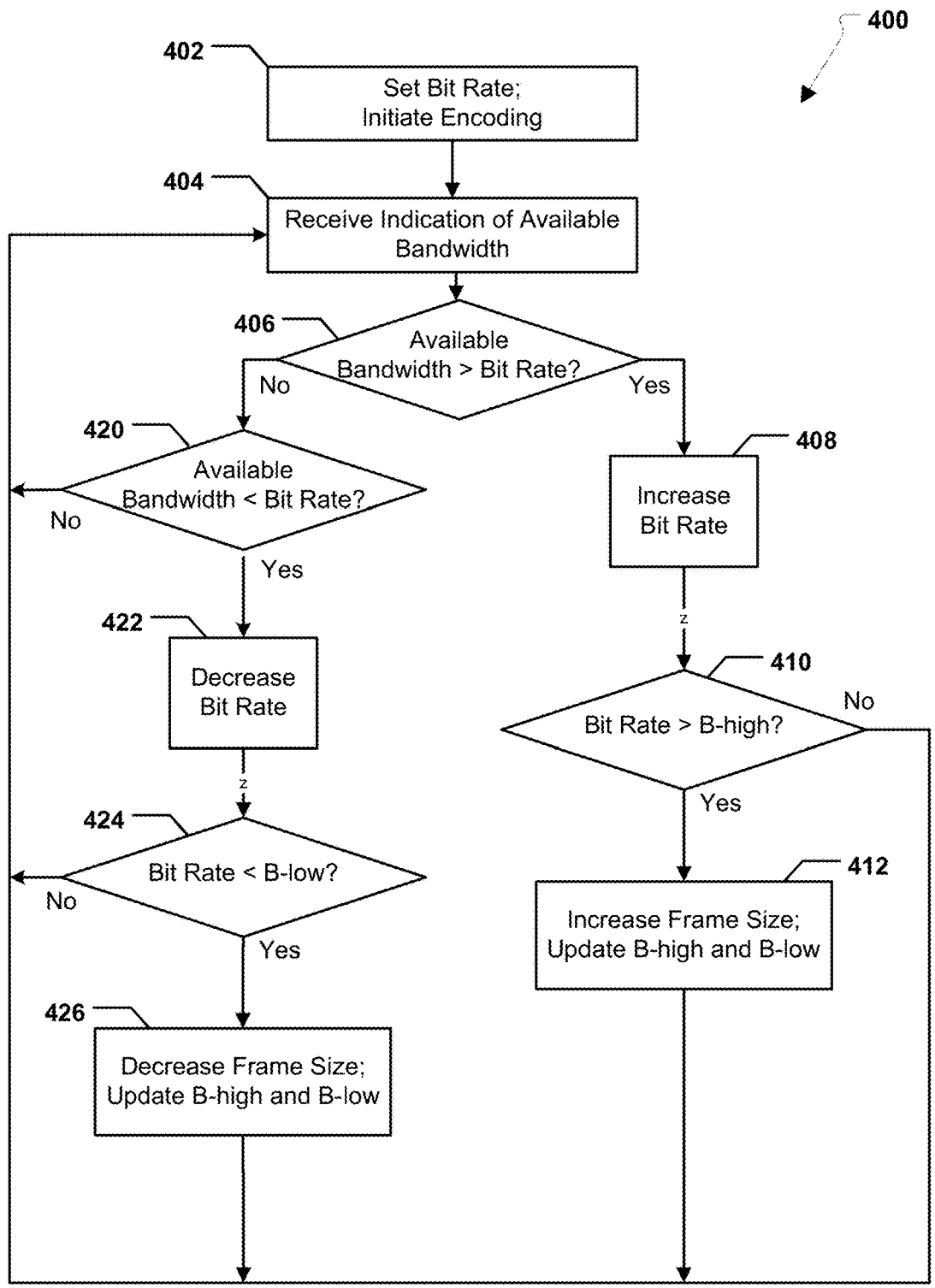
FIG. 4 is a flowchart that illustrates another implementation of a method of adjusting encoding parameters including frame size at a media stream device based on available network bandwidth.

FIG. 4 illustrates another particular implementation of a method 400 of adjusting encoding parameters including frame size based on a change in available network bandwidth. In an illustrative implementation, the method 500 may be performed by the media stream device 150, such as the encoder 156 of FIGS. 1-2.

The method 400 includes setting a bit rate and initiating encoding, at 402. For example, the camera 176 and the microphone 178 of the media stream device 150 may capture a media stream that includes audio and/or video data. The method 400 also includes receiving an indication of available bandwidth, at 404. In an illustrative example, the indication corresponds to an amount of encoded data in a write buffer, such as the first capacity data 260 that corresponds to the size 206 of the buffered encoded data 204.

The method 400 includes determining whether the available bandwidth is greater than the bit rate, at 406. In response to the available bandwidth being greater than the bit rate, the bit rate is increased, at 408, and a determination is made as to whether the bit rate is greater than a "high" bit rate threshold (B-high) is made, at 410. For example, the comparator 220 compares the encoding bit rate 172 to the higher bit rate threshold 226. If the bit rate is not higher than the high bit rate threshold, the method returns to block 404. If the bit rate is higher than the high bit rate threshold, the method 400 includes increasing the frame size and updating the "high" and "low" bit rate thresholds (B-high and B-low, respectively), at 412, and returns to block 404.

In response to the available bandwidth not being greater than the bit rate, at 406, the method 400 includes determining whether the available bandwidth is less than the bit rate, at 420. If the available bandwidth is not less than the bit rate, the method 400 returns to block 404. Otherwise, the method 400 includes decreasing the bit rate, at 422, and determining whether the bit rate is less than the low bit rate threshold, at 424. For example, the comparator 220 compares the encoding bit rate 172 to the lower bit rate threshold 224.

If the bit rate is not less than the low bit rate threshold, the method 400 returns to block 404. If the bit rate is less than the low bit rate threshold, the method 400 includes decreasing the frame size and updating the "high" and "low" bit rate thresholds (B-high and B-low, respectively), at 426, and returns to block 404.

The method 400 of FIG. 4 may thus enable an electronic device, such as the media stream device 150, to dynamically adjust encoding parameters including frame size in response to changes in available network bandwidth. Dynamic adjustment of encoding parameters including frame size enables the electronic device to enhance a quality of the media stream for playback at another device as compared to adjusting an encoding bit rate without adjusting encoding frame size. In the method 400 of FIG. 4, bit rate is always adjusted before determining whether to adjust frame size.

It is noted that the in accordance with the described techniques (including the methods 300 and 400 of FIGS. 3 and 4), a device may, in response to a single bandwidth indication: (1) compare the indicated bandwidth to one or more thresholds, (2) decrease encoding bit rate while maintaining encoding frame size, (3) decrease both encoding bit rate and encoding frame size, (4) increase encoding bit rate while maintaining encoding frame size, and/or (5) increase both encoding bit rate and encoding frame size. Further, the thresholds/windows used to determine whether to increase bit rate and/or frame size may be different than the thresholds/windows used to determine whether to decrease bit rate and/or frame size.

It should be noted that although various implementations are described herein with reference to "available bandwidth" of a network and a "bit rate" of a media stream, this is for example only and not to be considered limiting. For example, in some implementations a network availability for streaming media may be expressed as a bit rate, packet size, channel assignment, or other metric instead of, or in addition to, bandwidth.

It should be noted that the order of operations illustrated in the flowcharts of FIGS. 3-4 and described elsewhere herein are to be considered illustrative, and not limiting. In alternate implementations, the order of operations may be different. Further, one or more operations may be optional and/or replaced by other operations. In addition, one or more operations may be consolidated.

Further, although one or more of the foregoing implementations are described with reference to an electronic device sending a portion of a stream, detecting a change in available bandwidth, and then adjusting encoding of the stream, this order of operations is for illustration, and is not to be considered limiting. In particular implementations, the media stream device may transmit non-stream data (e.g., via TCP) to detect available bandwidth prior to encoding and transmitting a stream (or a portion thereof). Thus, in particular implementations, a mobile device may perform "pre-detection" prior to starting encoding and/or transmission of an initial portion (e.g., chunk) of a stream.

It should be noted that although the foregoing implementations are described with reference to a media stream being captured by a media stream device, in alternate implementations, the described techniques may also be used in conjunction with media data stored at the media stream device (e.g., a video on demand (VOD) stream). When the media data is stored at the media stream device 150, the media stream device 150 may decode the media data via the decoder 158 prior to re-encoding the data via the encoder 156.

In accordance with various implementations of the present disclosure, one or more methods, functions, and modules described herein may be implemented by software programs executable by a computer system. Further, implementations can include distributed processing, component/object distributed processing, and/or parallel processing.

Particular implementations can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, a hardware encoder, one or more other computing devices, or any combination thereof. The computer system may be connected, e.g., using a network, to other computer systems or peripheral devices. For example, the computer system or components thereof can include or be included within the media stream device 150 of FIG. 1.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular implementation, the instructions can be embodied in a computer-readable or a processor-readable device, such as the data storage device(s) 162. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, webcam feeds, birthday parties, school plays, and other streams captured by fixed or mobile devices. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

In a particular embodiment, a method includes reducing, at an encoder, an encoding bit rate of video data in response to a first indication of available bandwidth for transmission of the encoded video data. The method includes reducing an encoding frame size of the video data in response to the encoding bit rate falling below a first threshold. The method includes increasing the encoding bit rate in response to a second indication of the available bandwidth. The method also includes increasing the encoding frame size in response to the encoding bit rate rising above a second threshold, the second threshold greater than the first threshold.

In accordance with another embodiment, a device includes an encoder configured to reduce an encoding bit rate of video data in response to a first indication of available bandwidth for transmission of the encoded video data. The encoder is configured to reduce an encoding frame size of the video data in response to the encoding bit rate falling below a first threshold. The encoder is configured to increase the encoding bit rate in response to a second indication of the available bandwidth. The encoder is also configured to increase the encoding frame size in response to the encoding bit rate rising above a second threshold, the second threshold greater than the first threshold.

In accordance with another embodiment, a computer-readable storage device stores instructions that, when executed by a processor, cause the processor to perform operations. The operations include reducing, at an encoder, an encoding bit rate of video data in response to a first indication of available bandwidth for transmission of the encoded video data. The operations include reducing an encoding frame size of the video data in response to the encoding bit rate falling below a first threshold. The operations include increasing the encoding bit rate in response to a second indication of the available bandwidth. The operations also include increasing the encoding frame size in response to the encoding bit rate rising above a second threshold, the second threshold greater than the first threshold.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of encoding video data, the method comprising:
    performing a first operation, at an encoder, to increase an encoding bit rate of video data in response to a first indication of available bandwidth for transmission of encoded video data;
    increasing an encoding frame size of the video data in response to the encoding bit rate rising above a first threshold;
    performing a second operation to increase the encoding bit rate in response to a second indication of the available bandwidth; and
    increasing the encoding frame size in response to the encoding bit rate rising above a second threshold, the second threshold greater than the first threshold, wherein one or both of the first threshold and the second threshold is based on a window size.

2. The method of claim 1, wherein the second operation is performed after performing the first operation, and wherein the encoding frame size is increased from a first frame size to a third frame size in response to the encoding bit rate rising above the first threshold.

3. The method of claim 1, wherein the first threshold is based further on a bit rate threshold, and further comprising reducing the encoding bit rate in response to a third indication of the available bandwidth.

4. The method of claim 3, further comprising reducing the encoding frame size in response to the encoding bit rate falling below a third threshold, the third threshold less than the first threshold.

5. The method of claim 4, wherein the encoding frame size is reduced from a third frame size to a first frame size in response to the encoding bit rate falling below the third threshold.

6. The method of claim 4, wherein the third threshold and the first threshold are based on a bit rate threshold and the window size, and wherein the bit rate threshold corresponds to a midpoint between the third threshold and the first threshold.

7. The method of claim 6, wherein the window size corresponds to a difference between the first threshold and the third threshold.

8. The method of claim 4, wherein the third indication of the available bandwidth corresponds to an amount of encoded data in a write buffer exceeding a first backlog threshold.

9. The method of claim 8, wherein the first indication of available bandwidth corresponds to the amount of encoded data in the write buffer falling below a second backlog threshold.

10. The method of claim 1, further comprising transmitting a stream of encoded data to a remote device over a network connection.

11. A device comprising an encoder, the encoder configured to:
    perform a first increase of an encoding bit rate of video data in response to a first indication of available bandwidth for transmission of encoded video data;
    increase an encoding frame size of the video data in response to the encoding bit rate rising above a first threshold;
    perform a second increase of the encoding bit rate in response to a second indication of the available bandwidth; and
    increase the encoding frame size in response to the encoding bit rate rising above a second threshold, the second threshold greater than the first threshold, wherein one or both of the first threshold and the second threshold is based on the window size.

12. The device of claim 11, further comprising a write buffer coupled to the encoder, wherein the first indication of the available bandwidth corresponds to an amount of encoded data in the write buffer.

13. The device of claim 12, wherein the encoder is configured to perform the second increase after performing the first increase, and further comprising a network interface configured to transmit a stream of the encoded data from the write buffer to a remote device.

14. The device of claim 11, wherein the encoder includes a frame size selector configured to select a frame size based on a comparison of the encoding bit rate to one or more bit rate thresholds.

15. The device of claim 14, wherein the encoder further:
is configured to reduce the encoding bit rate in response to a third indication of the available bandwidth and to reduce the encoding frame size in response to the encoding bit rate falling below a third threshold that is less than the first threshold; and
includes a bit rate threshold generator configured to determine the third threshold and the first threshold based on a bit rate threshold and window size.

16. A computer-readable storage device storing instructions that, when executed by a processor, cause the processor to initiate or perform operations comprising:
performing a first increase, at an encoder, of an encoding bit rate of video data in response to a first indication of available bandwidth for transmission of encoded video data;
increasing an encoding frame size of the video data in response to the encoding bit rate rising above a first threshold;
performing a second increase of the encoding bit rate in response to a second indication of the available bandwidth; and
increasing the encoding frame size in response to the encoding bit rate rising above a second threshold, the second threshold greater than the first threshold, wherein one or both of the first threshold and the second threshold is based on a window size.

17. The computer-readable storage device of claim 16, wherein execution of the instructions causes the processor to perform the second increase after performing the first increase, and wherein the operations include transmitting a stream of encoded data to a remote device over a network connection.

18. The computer-readable storage device of claim 16, wherein the instructions when executed further cause the processor to:
reduce the encoding frame size from a first frame size to a second frame size in response to the encoding bit rate falling below a third threshold; and
increase the encoding frame size from the second frame size to the first frame size in response to the encoding bit rate rising above the first threshold.

19. The computer-readable storage device of claim 16, wherein the operations further include:
reducing the encoding bit rate in response to a third indication of the available bandwidth; and
reducing the encoding frame size in response to the encoding bit rate falling below a third threshold, the third threshold less than the first threshold.

20. The computer-readable storage device of claim 19, wherein the third indication of the available bandwidth corresponds to an amount of encoded data in a write buffer exceeding a first backlog threshold.

* * * * *